United States Patent [19]

Tolmie, Jr.

[11] Patent Number: 4,457,617
[45] Date of Patent: Jul. 3, 1984

[54] ELECTROSTATIC COPIER HAVING A CONTROL SYSTEM FOR PREVENTING JAMS

[75] Inventor: Robert J. Tolmie, Jr., Brookfield Center, Conn.

[73] Assignee: Pitney Bowes Inc., Stamford, Conn.

[21] Appl. No.: 365,426

[22] Filed: Apr. 5, 1982

Related U.S. Application Data

[63] Continuation of Ser. No. 140,878, Apr. 14, 1980, abandoned.

[51] Int. Cl.³ ............................................. G03G 21/00
[52] U.S. Cl. ......................................... 355/13; 83/205; 355/16
[58] Field of Search ................... 355/13, 14 R, 16, 77; 83/203, 204, 205

[56] References Cited

U.S. PATENT DOCUMENTS

| | | | |
|---|---|---|---|
| 3,181,420 | 5/1965 | Rautbord et al. | |
| 3,626,956 | 12/1971 | Sauder | 271/57 X |
| 3,637,305 | 1/1972 | Tanaka et al. | 355/13 |
| 3,645,157 | 2/1972 | DiGiulio et al. | 83/205 |
| 3,706,490 | 12/1972 | Aasen et al. | 355/13 |
| 3,737,159 | 6/1973 | Washio et al. | 271/57 |
| 3,797,347 | 3/1974 | Miciukiewicz et al. | 83/205 |
| 3,830,124 | 8/1974 | Ravera et al. | 83/205 |
| 3,843,251 | 10/1974 | Washio et al. | 355/13 |
| 3,888,147 | 6/1975 | Ravera et al. | 83/205 |
| 3,948,130 | 4/1976 | Schroter | 83/203 |
| 4,175,850 | 11/1979 | Bujese | 355/13 |
| 4,193,330 | 3/1980 | Knox | 355/13 X |
| 4,265,153 | 5/1981 | Price | 83/205 X |
| 4,360,263 | 11/1982 | Miyoshi et al. | 355/13 X |

Primary Examiner—Fred L. Braun
Attorney, Agent, or Firm—Peter Vrahotes; Albert W. Scribner; William D. Soltow, Jr.

[57] ABSTRACT

An electrostatic copier having a control system wherein switches are used to detect conditions that would lead to paper jams. Such jams could result from sheets that are too short to be conveyed or as a result of overlong originals being copied during a copy cycle of an electrostatic copier of the coated paper type having an automatic document feeder. Circuitry is provided to resequence the system if copy paper is in transmit at the time of a power failure and the copy paper is located in a position that would result in a jam or an overlong copy sheet if the copier were to operate from a start mode.

2 Claims, 4 Drawing Figures

ELECTROSTATIC COPIER HAVING A CONTROL SYSTEM FOR PREVENTING JAMS

This is a continuation of application Ser. No. 140,078, filed Apr. 14, 1980, now abandoned.

BACKGROUND OF THE INVENTION

This invention is directed to that class of electrostatic copiers known as coated paper copiers and which have feeders for automatically supplying documents of which copies are to be made to the copier. In such copiers an image of an original document is created electrostatically upon a sheet having a photoconductive surface and the electrostatic image is developed directly on such sheet. More specifically, this invention is directed to coated paper copiers wherein a roll or web of coated paper is used as a source of copy paper and means is provided for cutting the web the appropriate length, as opposed to cut sheets being available from a source such as a tray.

When the copy paper is in the form of a rolled web, a number of problems are encountered. If the copy paper is cut and is not sufficiently long so as to extend between the drive rollers located along the path of travel, a jam will occur as a result of copy paper falling between such rollers thereby interfering with the operation of the copier. Another problem arises as a result of a power failure when the copy paper is in the bite of the drive rollers but before the copy paper has been cut to its appropriate length. Upon re-starting the copier, if the timing sequence is initialized, the web could run an extended period so that an overly long copy would result. Still another problem involves faulty feed operation of the automatic feeder wherein the original documents are shingled and the copier senses no trailing edge of an original, i.e., there is no space between originals being supplied. A further problem arises if the length of the original exceeds a maximum allowable length. Speed variations in paper transported between rollers in a copy machine will cause overly long copy paper to become damaged or torn. In the case where the copier uses a fuser roller, the copy could become wrinkled whereupon the photoconductive coating would offset onto the fuser roller.

SUMMARY OF THE INVENTION

The overcoming of the above problems is achieved through the use of a switch at the outlet of the automatic document feeder and the use of another switch in the copy paper path. These switches are used in conjunction with appropriate circuitry to make sure a minimum copy length is achieved even though the original document may not have a length that is equal to the minimum required. This is accomplished through a timer that will prevent the cutting of the web until a minimum length of copy sheet has been obtained. The problem relative to power failure is solved by simulating a copy cycle during the interval from the power failure until the next document is fed. The copy switch is monitored to see if it is closed and the document switch is checked to determine if it is open. If so, a signal is generated which stops the automatic document feeder and simulates a copy cycle so that a copy length greater than the minimum required to be fed is assured. Thereafter, feeding of the next document may be commenced. This latter function is achieved with or without the document that initiated the copy cycle prior to the power failure being in the copier. Circuitry is also provided to prevent long copy lengths that damage a copier. This includes a timer that starts to time when the document switch is activated and will cut the copy paper after the length has exceeded the maximum allowed.

DETAILED DESCRIPTION OF THE PREFERRED EMBODIMENT

Figure 1:
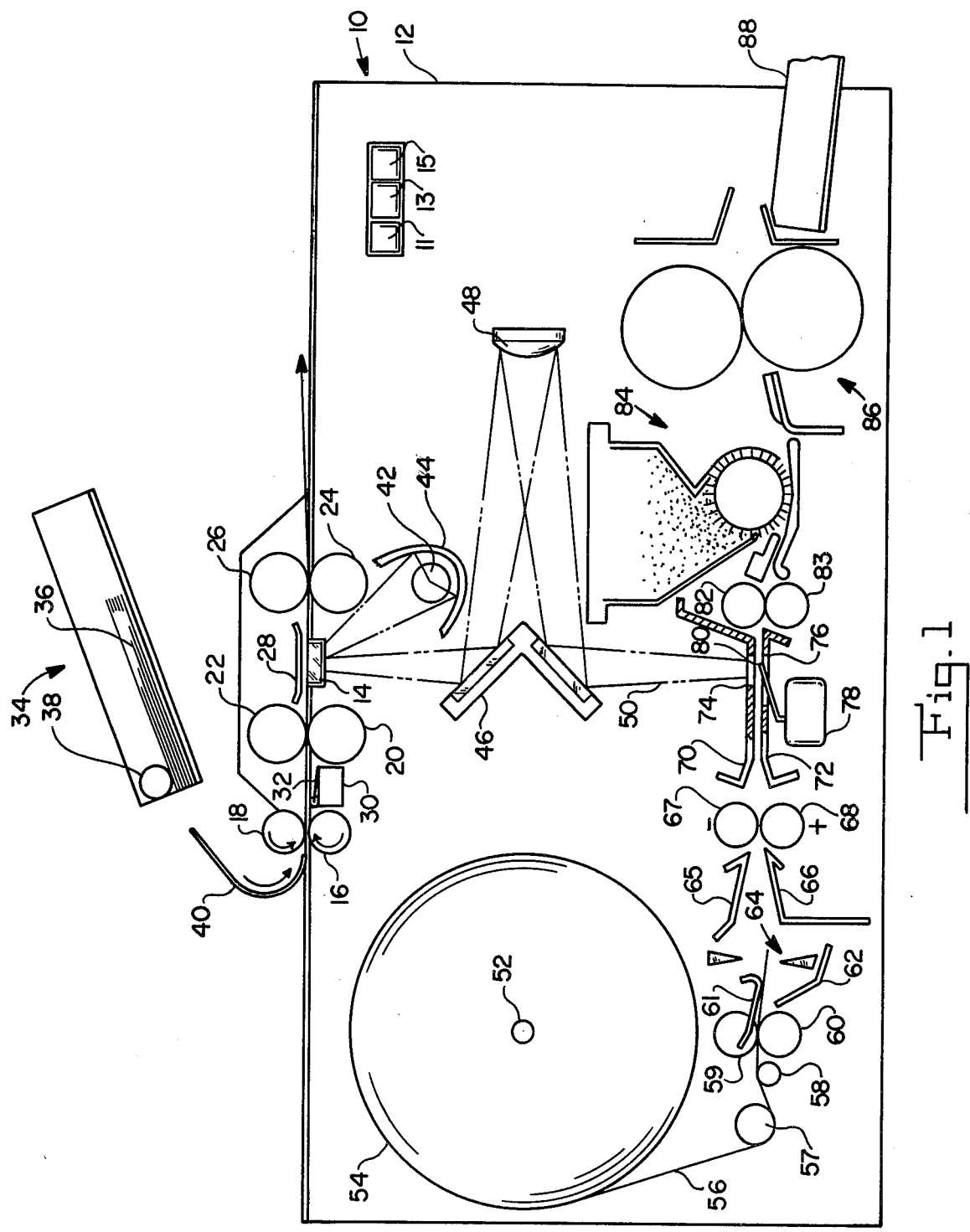
FIG. 1 shows a partially longitudinal cross section view of a copier utilizing the principals of the instant invention.

Referring to FIG. 1, an electrostatic, coated paper copier is shown generally at 10 and includes a housing 12 with a window 14 therein. The housing 12 has three switch buttons attached to the side thereof, a stop switch button 11, an automatic document feed (ADF) switch button 13, and an ADF by-pass switch button 15. A pair of rollers 16 and 18 are disposed adjacent one another at the top of the housing 12 and adjacent thereto are another pair of rollers 20, 22 which, in combination with still another pair of rollers 24 and 26, form a stream feeder for feeding an original document past the window 14. Appropriate openings are located in the housing 12 to accommodate the rollers 16, 20 and 24. Immediately above the window 14 is a guide 28 that tends to keep a document along the document feed path indicated by the linear arrow shown above the housing 12 in FIG. 1. Intermediate the rollers 16,18 and the rollers 20,22 is a document feed switch 30 having an arm 32 that extends into the document feed path.

Located above the housing 12 in the vicinity of the window 14 is an automatic document feeder 34 that is adapted to receive documents 36 which are to be fed past the window 14. As used in this specification, the term document is defined as original printed matter of which copies are to be made. The automatic document feeder 34 includes a feed roller 38 which engages and feeds the uppermost document 36 and a deflector 40 located adjacent the document feeder 34 and the rollers 16, 18 to deflect a document fed by the roller 38 into the bite of the rollers 16, 18. Document 36 may be fed automatically through use of the automatic document feeder 34 or manually by forwarding a document between the housing 12 and the deflector 40 into the bite of the rollers 16, 18.

Located within the housing 12 is a lamp 42 with a reflector 44 disposed thereabout such that light is directed through the window 14 as shown in FIG. 1. A generally V-shaped mirror 46 is located immediately below the window 14 and another mirror 48 is located within the housing 12 in longitudinal alignment with the mirror 46. With this construction, the light from the lamp 42 is directed through the window 14, deflected from a document being fed along the feed path, to the mirror 46, onto the mirror 48, back to the mirror 46 and downwardly toward the bottom of the housing 12 to define a light path 50.

Supported within the housing 12 is a shaft 52 upon which is mounted a roll 54 of web material 56 which is paper coated on one side with a photoconductive material. A pair of idler rollers 57 and 58 are supported within the housing 12, as is a pair of drive rollers 59 and 60. The web 56 is supported by the rollers 57, 58 and driven by the drive rollers 59, 60 towards a pair of guides 61 and 62 which keep the web in alignment. Downstream from the guides 61 and 62 is a knife, shown generally at 64 which receives the web between a pair of blades that are operative to close and cut the web. Downstream from the knife 64 is another pair of guides 65 and 66 which are adjacent to a pair of charge rollers 67 and 68. These charge rollers 67, 68 serve the function of not only imparting a charge to the photoconductive surface of the web 56, but also serve as drive rollers for the web. Downstream from the charge rollers 67, 68 are a pair of guide members 70, 72 having vertically aligned openings 74 and 76 therein. The upper opening 74 allows the light path 50 to fall upon that portion of the photoconductive surface of the web 54 being conveyed between the guides 70, 72. Located below the guide 72 is a copy switch 78 having an arm 80 that extends into the opening 76 and is engageable with the web 56. Downstream from the guides 70, 72 is another pair of rollers 82, 83 and further downstream from these rollers is a development station 84 and a fixing station 86 the details of which will not be described as the same do not form part of the invention. Located outside of the housing 12 is a receptacle 88 into which copy sheets may be fed. The rollers 59, 60, 67, 68, 82, 83, the development station 84 and the fixing station define a feed path for the copy paper.

Figure 2:
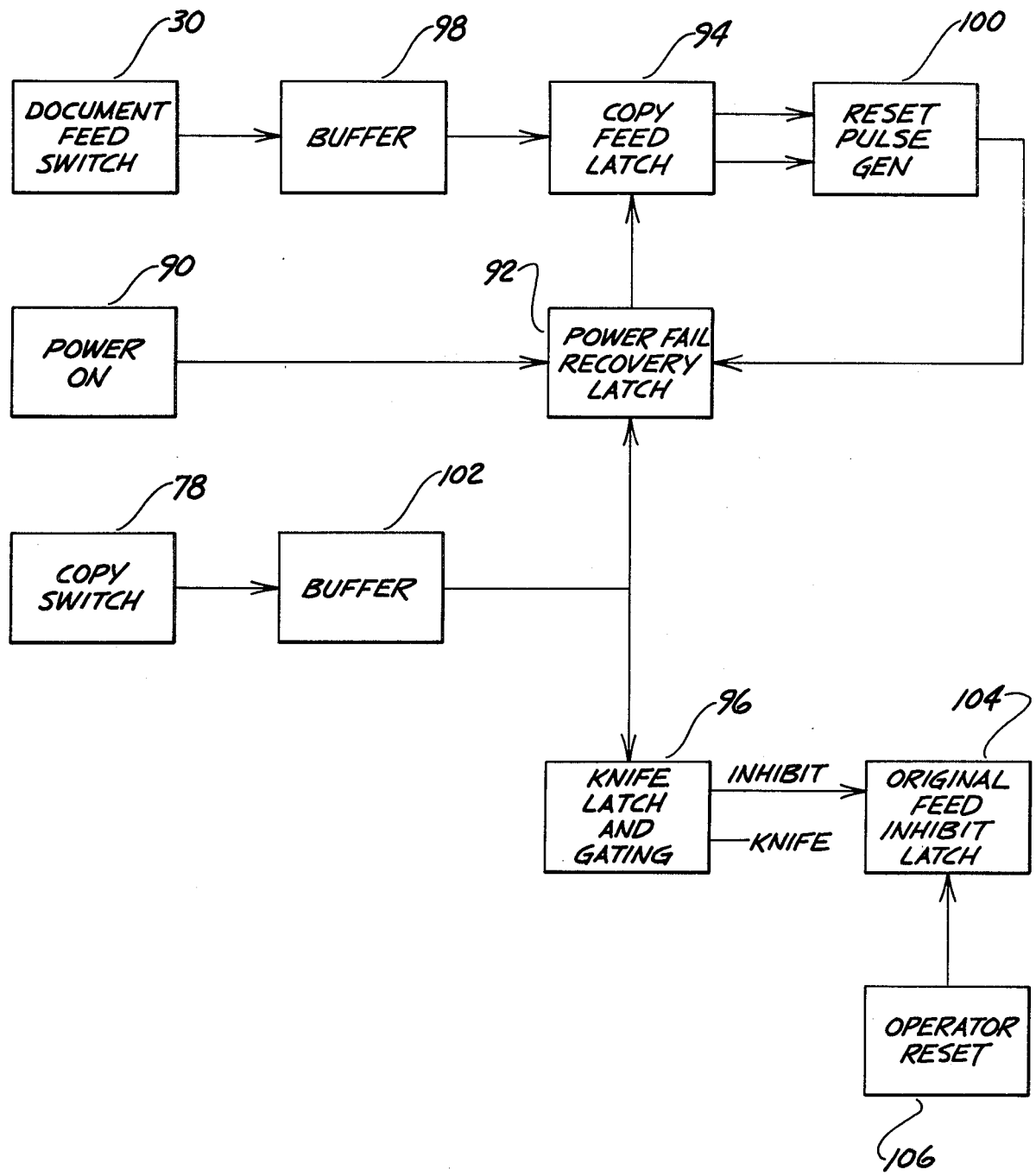
FIG. 2 shows a block diagram of the circuitry utilized to accomplish the instant invention.

Referring now to FIG. 2 a general description of the sequence of operation will be given with regard to the control of the various components shown in FIG. 1. A source of power is provided to the copier and is represented by the Power On block 90. This Power On 90, serves as an electrical signal used to initialize all latches. A Power Fail Recovery Latch 92 is in electrical connection with the Power On 90, a Copy Feed Latch 94 and a Knife Latch and Gating 96. The Document Feed Switch 30 is in electrical connection with the Copy Feed Latch 94, therebeing a buffer 98 therebetween. A Reset Pulse Generator 100 is an electrical connection with the Copy Feed Latch 94 and the Power Fail Recovery Latch 92. The Copy switch 78 is in electrical connection with the Power Fail Recovery Latch 92 and the Knife Latch and Gating 96, therebeing a buffer 102 therebetween The Knife Latch and Gating 96 is in electrical connection with a Document Feed Inhibit Latch 104 which in turn is in electrical connection with an Operator Reset 106.

The Power On 90 initializes all the latches when enabled to place the copier is a state of readiness. The Document Feed Switch 30 is enabled by the leading edge of a document 36 being fed along the document path. This sets the Copy Feed Latch 94 to thereby cause feeding of the web 56 and also sets the Reset Pulse Generator 100. The Copy Switch 78 is actuated when the leading edge of the web 56 is sensed and the Knife Latch and Gating 96 will be enabled in response to the document switch 30 being opened and in response to the Reset Pulse Generator 100, as will be explained in further detail hereafter.

Figure 3:
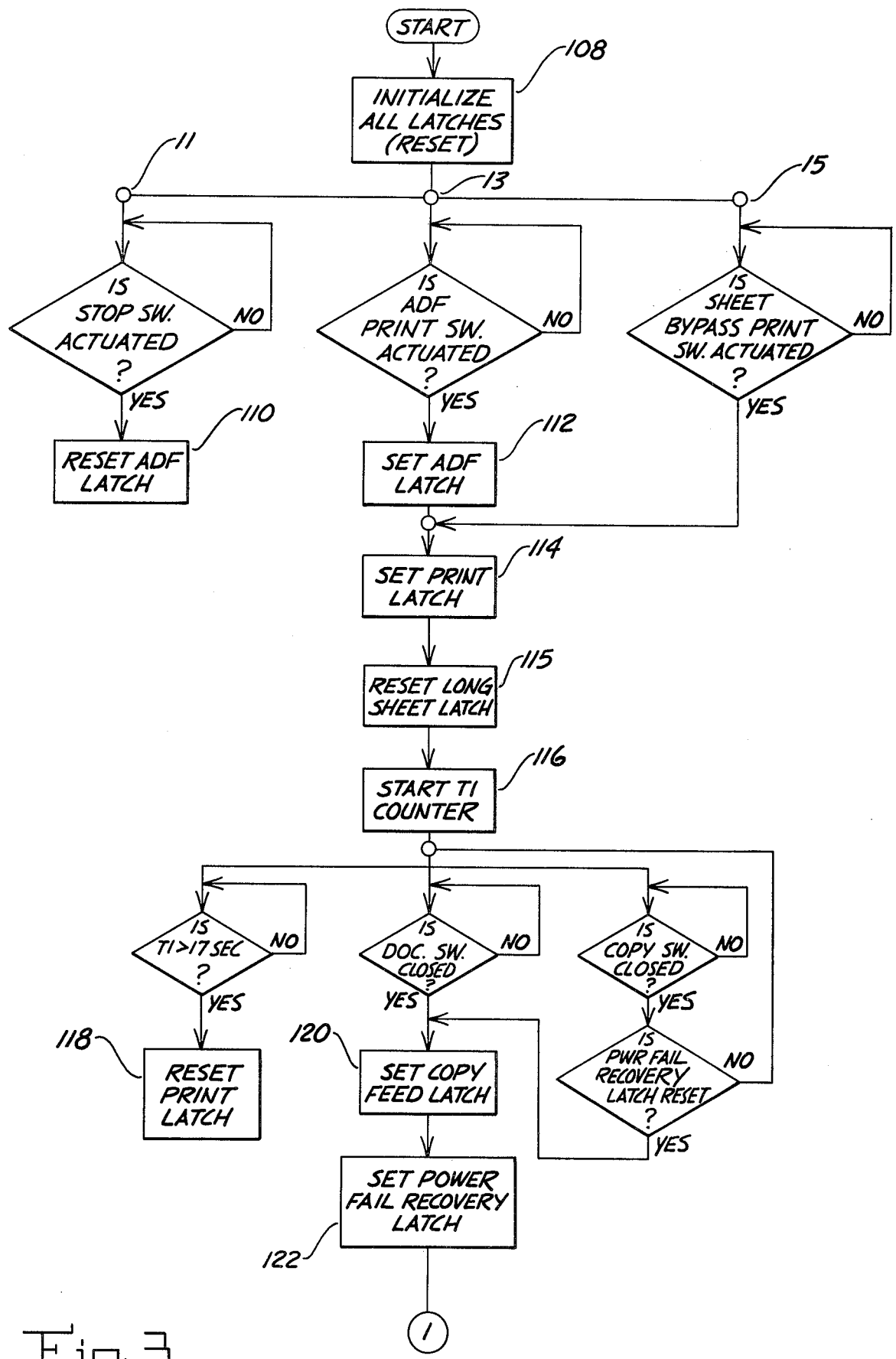
FIGS. 3 and 4 show a flow chart of the system used to prevent jams in accordance to the instant invention.
Figure 4:
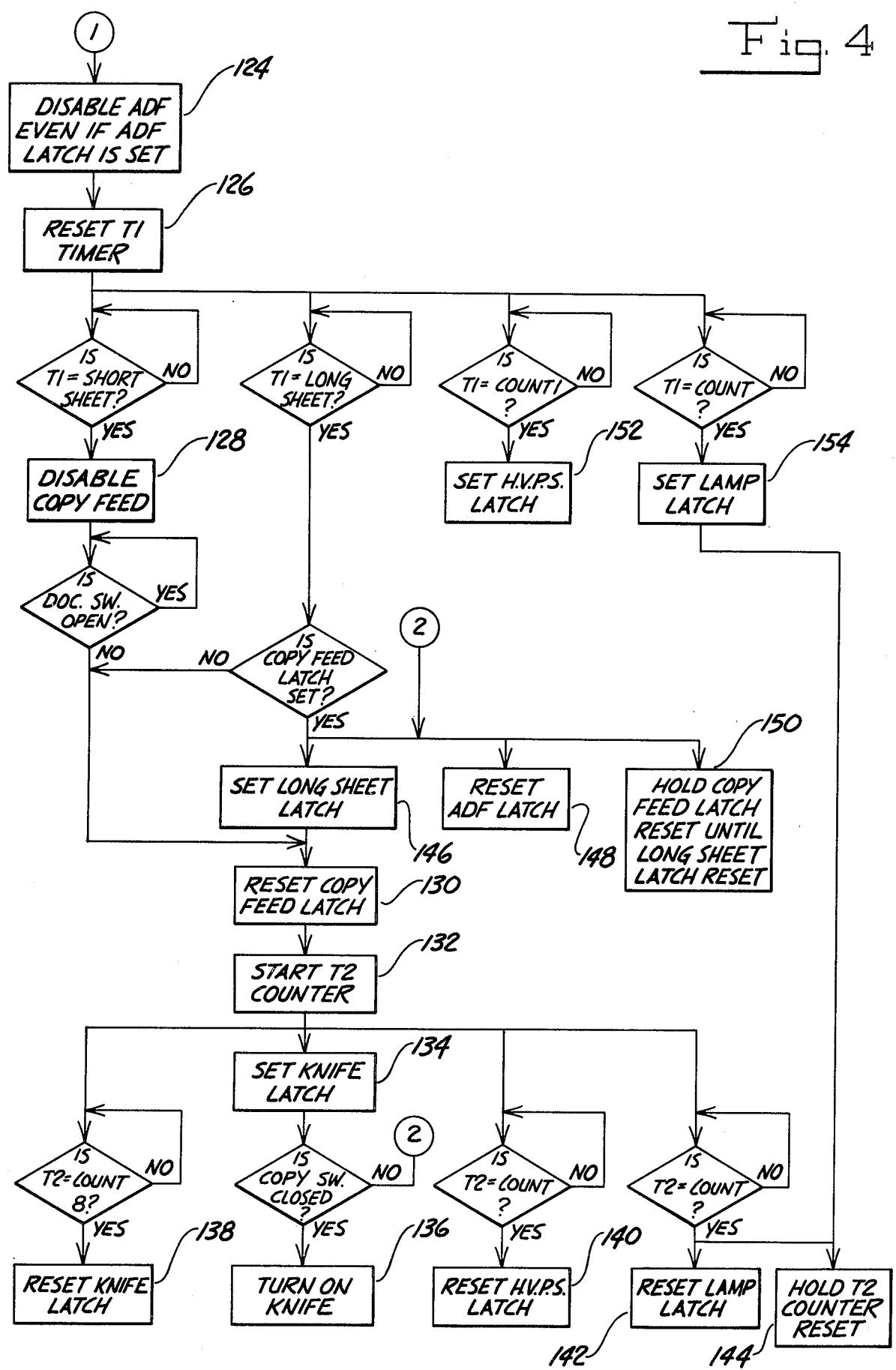

Referring now to FIGS. 3 and 4, the control system for the copier 10 will be described in detail. With power being supplied to the copier 10, all latches are initialized 108. The system will then determine if any of the switches 11, 13, 15 has been enabled. If the stop switch button 11 is depressed then the Automatic Document Feed Latch 110 is reset and the automatic document feeder 34 will be disabled but the machine will be able to make copies of documents which are fed manually if one of the print buttons had already been depressed. If it is determined that the switch print ADF button 13 has been depressed, the command is given to set the ADF Latch 112, set the Print Latch 114, then reset the Long Sheet Latch 115. If, instead, the ADF bypass button 15 is depressed then the system will bypass the SET ADF latch 112 and proceed immediately to set the Print Latch 114 and reset the Long Sheet Latch 115. Upon the setting of the Print Latch 114, the T1 Counter 116 is enabled and the T1 counter starts to count. A determination is made as to whether T1 is greater than a given period, such as 17 seconds, and, if so, then a Reset Print Latch 118 command is given so that the copier is disabled and the timer T1 is reset. If T1 is less than 17 seconds then the system will determine if the document switch 30 and the copy switch 78 are closed. Under normal conditions, the document switch 30 will be closed and the copy switch 78 will be open and the system will directly set the Copy Feed Latch 120. After the Copy Feed Latch 120 is set, then the Power Fail Recovery Latch 122 is set and the automatic document feeder is disabled 124. If the copy switch is closed then a determination is made whether the power fail recovery latch is reset and if this answer is yes then the command is given to set the Copy Feed Latch 120. If "no" then the system waits for the document switch 30 to be closed.

With the above commands completed, following the command Disable ADF Even if ADF Is Latch Set 124, the command is given to reset timer T1 126. At this point a number of determinations is made: (1) whether T1 is equal to or greater than the period required to pass the short sheet requirement, (2) whether the period is equal to or greater than the period required to pass the long sheet requirement and (3) whether the number of counts required to set the high voltage power supply for the charge rollers 59, 60 and the lamp 42 has been reached. If the short sheet test is passed, the command is given to Disable The Copy Feed 128 and there will be a delay before the document switch 30 is accessed to determine whether it is opened. If the document switch is opened then the Copy Feed Latch 130 is reset and Counter T2 132 is started. Upon the start of counter T2, the Knife Latch 134 is set and the system determines if the copy switch 78 is closed. If the copy switch 78 is closed then the Turn On Knife Latch 136 is set until T2 has a count equal to or greater than a given number, at which time the Reset Knife Latch 138 is enabled. When T2 is between certain counts, the High Voltage Power Supply Latch 140 is reset. When T2 is equal to a given count, the Lamp Latch 142 is reset unless T1 is not reset on a new copy cycle and has reached another given count at which time the T2 Counter Latch 144 is reset.

Following the reset of timer T1 126 by means of the document switch 30, the system inquires whether T1 is equal to or greater than the long sheet count. If yes, then the system will determine if the copy feed latch is set. If this is determined positively then the system will set the Long Sheet Latch 146, reset the ADF Latch 148, and hold the Copy Feed Latch Reset 150 until the Long Sheet Latch is reset. With the proper setting of the Long Sheet Latch 146 the same sequence is followed as was described when it was determined that the original switch 30 was found to be opened. When counter has attained a given T1 count, the High Voltage Power Supply Latch 152 is set The Lamp Latch 154 is set when another count is reached by counter T1.

With reference to all the Figures of the drawing, the overall operation of the copier 10 will be described. With the power on switch 90 and the ADF switch button 13 depressed the automatic document feeder will commence to feed a document 36 by action of the roller 38 across the deflector 40 through the rollers 16, 18 and into contact with the document switch 30. With the document switch 30 closed the copy feed then commences and the time is determined for the passage of the original 36 across the switch 30. If this time is equal to or greater than a minimum time then normal operation continues. This simply means that the short sheet test has been passed and that the copy sheet will be sufficiently long to extend between adjacent feed rollers such as the rollers 59, 60 and the rollers 67, 68. In the system being described this time is 1.375 seconds. If the original document 36 has a length such that its feeding will not require 1.375 seconds then the original switch 30 will remain enabled until this 1.375 seconds is achieved to provide the appropriate length of copy.

The web 56 will continue to be fed until the trailing edge of the document 36 is sensed by the document switch 30. With this occurrence the knife 64 will be enabled and the web 56 cut the same length as the document 36. On the other hand, if the trailing edge of the original 36 is not sensed after a predeterminationed time, then the web 56 is cut by the knife 64 and the copier will be disabled. This is to avoid problems associated with copy sheets that are too long or in the situation when the ADF 34 is not feeding the documents properly and they are overlapped or shingled. After the period or after the trailing edge of a document 36 is sensed by the switch 30, T1 will start re-counting.

If a power failure occurs during the making of a copy, determinations are made if the copy switch 78 is closed and if the Power Fail Recovery Latch is reset when power is resumed. More specifically, problems do not arise in a power failure if the web 56 is not in the bite of the feed rollers 67, 68 or if the knife 64 had already cut the web 56. But, if the web has not been cut and it is in the bite of the rollers 67, 68, the web would otherwise continue to feed when the copier is restarted until it sees the trailing edge of the next original. This means that a document 36 is not at the location of the document switch 36 and this could lead to problems because of roller speed differential. More specifically, downstream rollers are set to rotate at a speed somewhat greater than upstream rollers to avoid slack. If the web 56 is too long it is possible that a rupture could occur, which in combination with a subsequent cutting of the web could lead to a jam. The problem is solved through monitoring the document switch 30 and the copy switch 78 in the interim from the power failure until the next document feed. The copy switch 78 is monitored to see if this switch is actuated or becomes actuated before the document switch 30 is enabled. If this occurs, the copy cycle is initiated and the minimum copy length is produced at which time the web is cut. The copy switch continues to be monitored during the initiated cycle to assure the presence of copy paper at this switch. Following this, the next document 36 is then fed. On the other hand, if the document switch 30 is closed at start up after power fail, the web 56 will be cut when the trailing edge of the document clears the document switch 30 to open the same.

What is claimed is:

1. A control system for an electrostatic copier having a window, means for conveying a document over the window and along a first path, a second path along which a photoconductive web is conveyed to be imaged, developed and fused, means for conveying the photoconductive web along the second path, a knife located along the second path for receiving the photoconductive web and operative to cut the web upon being enabled, and means for supplying power to the copier, comprising:

first sensing means for sensing the presence of a document being conveyed along the first path, said first sensing means being enabled upon a document making contact therewith and disabled when such contact is ended, second sensing means located on the second path downstream from said knife, said second sensing means being enabled upon the photoconductive web making contact therewith and disabled when contact is ended, counter means connected to said first and second sensing means, said counter means and said photoconductive web conveying means being enabled upon said first sensing means being enabled, means for enabling the knife to cut a photoconductive web therein and disabling said photoconductive web conveying means upon said first sensing means being disabled, means for inhibiting the enabling means for said knife upon said second sensing means being enabled and continuing operation of said photoconductive web conveying means if said first sensing means is disabled prior to a first count of said counter means being attained, means for enabling said knife and disabling said photoconductive web conveying means upon said first count being attained after said first sensing means has been disabled, and means for disabling the power supply means if said counter means exceeds a second count, said second count being greater than said first count.

2. The control system of claim 1 including means for enabling the photoconductive web conveying means when said first sensing means is disabled and said second sensing means is enabled for a period equal to said first count and means for disabling said photoconductive web conveying means and enabling said knife following said period.

* * * * *